United States Patent
Surana et al.

(10) Patent No.: US 12,429,598 B2
(45) Date of Patent: Sep. 30, 2025

(54) DISTRIBUTED SATELLITE CONSTELLATION FOR COOPERATIVE MULTI-TARGET TRACKING

(71) Applicant: Raytheon Company, Arlington, VA (US)

(72) Inventors: Amit Surana, Newington, CT (US); Yiqing Lin, Montgomery, NJ (US); Tuhin Sahai, San Francisco, CA (US); Laura A. Gordon, Aurora, CO (US); David C. Fisher, Evergreen, CO (US)

(73) Assignee: Raytheon Company, Arlington, VA (US)

( * ) Notice: Subject to any disclaimer, the term of this patent is extended or adjusted under 35 U.S.C. 154(b) by 551 days.

(21) Appl. No.: 17/885,408

(22) Filed: Aug. 10, 2022

(65) Prior Publication Data
US 2024/0402347 A1 Dec. 5, 2024

(51) Int. Cl.
*G01S 19/02* (2010.01)
*G01S 19/09* (2010.01)

(52) U.S. Cl.
CPC ............. *G01S 19/02* (2013.01); *G01S 19/09* (2013.01)

(58) Field of Classification Search
CPC .......... G01S 19/00; G01S 19/02; G01S 19/09; G01S 5/0205; G01S 5/0081
See application file for complete search history.

(56) References Cited

U.S. PATENT DOCUMENTS

| | | | | |
|---|---|---|---|---|
| 6,122,507 | A * | 9/2000 | Gerard | H04B 7/18541 455/12.1 |
| 2017/0105153 | A1 * | 4/2017 | Ashrafi | H04B 17/336 |
| 2018/0270761 | A1 * | 9/2018 | Garcia | H04B 7/18543 |
| 2021/0036772 | A1 * | 2/2021 | Miranda | H04B 7/18513 |
| 2022/0271824 | A1 * | 8/2022 | Blumenthal | H04B 7/0691 |
| 2023/0358896 | A1 * | 11/2023 | Quintero | G01S 19/258 |

OTHER PUBLICATIONS

Kim, J. et al. "Economic Theoretic LEO Satellite Coverage Control: An Auction-based Framework," arXiv:2009.09619v1, Sep. 21, 2020, 3 pages.
Li, F. et al. "Spectral Efficiency Enhancement in Satellite Mobile Communications: A Game-Theoretical Approach," IEEE Wireless Communications, Feb. 2020, pp. 200-205.
Nixon, M. et al. "Double-Auction-based Management of Satellite Sensors," Technology Review Journal, Fall/Winter 2002, pp. 29-44.
Picard, G. "Auction-based and Distributed Optimization Approaches for Scheduling Observations in Satellite Constellations with Exclusive Orbit Positions," arXiv:2106.03548v3, Jul. 27, 2021, 9 pages.
Teske, et al. "Distributed Satellite Collection Scheduling Optimization Using Cooperative Coevolution and Market-based Techniques," 2020 IEEE International Systems Conference (SysCon), Sep. 2020, 12 pages.

* cited by examiner

*Primary Examiner* — Calvin Cheung
(74) *Attorney, Agent, or Firm* — Schwegman Lundberg & Woessner, P.A.

(57) ABSTRACT

An auction-based distributed method for cooperative multi-target tracking by a plurality of satellites, includes distributed target tracking error and utilization computation as an auction bid across the satellite and uses message-passing to find best bid, handles different tracking requirements via definition of bids and modification of task definition used during the bidding process, and selected a list of auction winners to track the target.

20 Claims, 5 Drawing Sheets

DISTRIBUTED SATELLITE CONSTELLATION FOR COOPERATIVE MULTI-TARGET TRACKING

FIELD OF THE INVENTION

The disclosed invention generally relates to satellite target tracking, and more particularly to distributed satellite management for cooperative multi-target tracking.

BACKGROUND

As the space launch costs are decreasing and the capabilities of small satellites are increasing, new decentralized space architectures are emerging, for example, proliferated satellite constellations (e.g., proliferated low Earth orbit (pLEO)) that may include hundreds, or even thousands of satellites in (low) orbits.

These new architectures further enable commercial Earth observation and satellite communications, such as, global broadband Internet coverage broadcast from orbit and high-revisit overhead imagery of much of the Earth's surface. The application of proliferated constellations also includes the significant increase in the number of satellites on orbit will shape the future defense operating environment in space. The increase in the availability of satellite imagery and communications bandwidth on the open market also affects the operating environment in ground, maritime, and air domains, offering new capabilities that can address the problems facing the defense and commercial communication industries for applications, such as, tracking mobile targets, operating in the Arctic, or providing resilient space support in the face of growing counterspace threats.

Modern tracking systems typically include multiple target tracking (MTT) systems, in which one or more sensors generate multiple detections from multiple targets, and one or more tracks are used to estimate the states of these targets. The new multi-target tracking systems need to meet all or several demanding requirements of:

- Covering all the target tracks while obeying predefined satellite vehicle (SV) hand off overlap requirements,
- Providing coverage using requisite minimum number of SVs,
- Complying with SV target visibility constraints incorporating sun angles, and SV duty cycle constraints,
- Incorporating task prioritization,
- Trading off tracking accuracy and SV utilization, and
- Handling dynamic/uncertain missile launches (or new targets).

Therefore, there is a need for a real time distributed framework for collection tasking of proliferated satellite constellation (e.g., pLEO) to enable cooperative multi-target tracking while maintaining a chain of custody.

SUMMARY

In some embodiments, the disclosure is directed to a new auction-based distributed optimization method for cooperative multi-target satellite tracking, based on sequential single item auction framework.

In some embodiments, the disclosure is directed to a method for an auction-based satellite cooperative multi-target tracking, executed by one or more satellite vehicles (SVs) in a constellation of SVs. The method executed by a group of satellite vehicles (SVs) include: a) receiving tracking information from a tracker by a plurality of SVs in the constellation; b) detecting an event related to a target by the plurality of SVs responsive to the tracking information; c) computing a reward value to the target, by each of the plurality of SVs; d) communicating the reward value in a bid message to neighboring SVs, by each of the plurality of SVs; e) selecting a first winner SV with a best reward value and placing the first winner SV in a winner list; f) Removing the first winner SV from the plurality of SVs to form a second the plurality of SVs; g) determining whether all target tracking requirements are met by the plurality of SVs; h) when all target requirements are not met, computing a second reward value for the target, by each of the second plurality of SVs; i) communicating the second reward value in a second bid message to neighboring SVs, by each of the second plurality of SVs; j) selecting a second winner SV with maximum second reward value and storing the second winner SV in the winner list; k) removing the second winner SV from the second plurality of SVs to form a third plurality of SVs; l) repeating processes g to k until the target tracking requirements are satisfied, to form a final winner list; and m) tracking the target using the final winner list.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAIL DESCRIPTION

Some embodiments of the disclosure are related to a new market auction-based distributed optimization method for cooperative multi-target tracking, based on sequential single item auction framework. The method distributes the auction bid computation across a constellation of satellite vehicles (SVs) and uses message-passing based on max-consensus algorithm to find best bid and handles different tracking requirements via novel definition of bids and modification of task definition used during the bidding process. The method is executed on one or more of the SVs, each having processing circuits. Auction algorithms have been used in a business setting to determine the best prices on a set of products offered to multiple buyers. The algorithm is typically an iterative procedure, where multiple bids are compared to determine the best offer, with the final sales going to the highest bidders.

Each SV includes electronics, communications and processing circuit for tracking targets, executing the auction processes, generating and storing various data structures and formulating and sending messages. The term "processing circuit" is used herein to mean any combination of hardware, firmware, and software, employed to process data or digital signals. Processing circuit hardware may include, for example, application specific integrated circuits, general purpose or special purpose central processing units (CPUs), digital signal processors, graphics processing units, and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

It is readily understood that the lists, groups, messages and SV's information that are computed, generated and/or utilized may be various unique data structures that are stored in and accessed from a computer memory by the processing circuits of the SVs.

In some embodiments, the disclosure utilizes a new auction-based distributed optimization approach for distributed satellite management for cooperative multi-target tracking, where the processing is distributed among the SVs in the constellation. In some embodiments, the approach is based on sequential single item auction framework, where each SV detects events (for example launch events of targets) and communicates with neighboring SVs. Each neighboring SV computes reward to the target(s) and plan in a distributed fashion to form an optimal number (team) of SVs, which meets the target tracking requirements. In the case of new target(s), each SV updates the projected path and/or loss of track and triggers a (auction-based) re-planning.

The auction bid (reward value) computation is distributed across the SVs, for example, by using message-passing based on a consensus algorithm to find best bid (most suitable SV). The approach is capable of handling different tracking requirements via novel definition of bids and modification of task definition used during the bidding process among the SVs.

Figure 1:
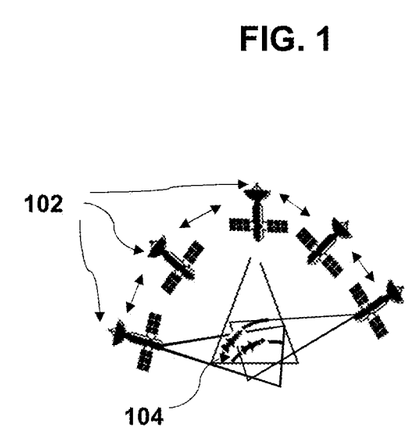
FIG. 1 depicts an environment with multiple satellite vehicles (SVs) and multiple targets, according to some embodiments of the disclosure.

FIG. 1 depicts an environment with multiple satellite vehicles (SVs) and multiple targets, according to some embodiments of the disclosure. As shown, a number of SVs 102 in a constellation of SVs (e.g., pLEO SVs), each include electronics, communications and processing circuit to detect launch events (of one or more targets 104) and communicate with neighboring SVs. Each neighboring SVs compute their reward values to the target, and plan in a distributed fashion to form an optimal team of winner SVs that meets target tracking requirements. A track re-planning is triggered for new launches or updates in projected path/loss of the targets.

Figure 2:
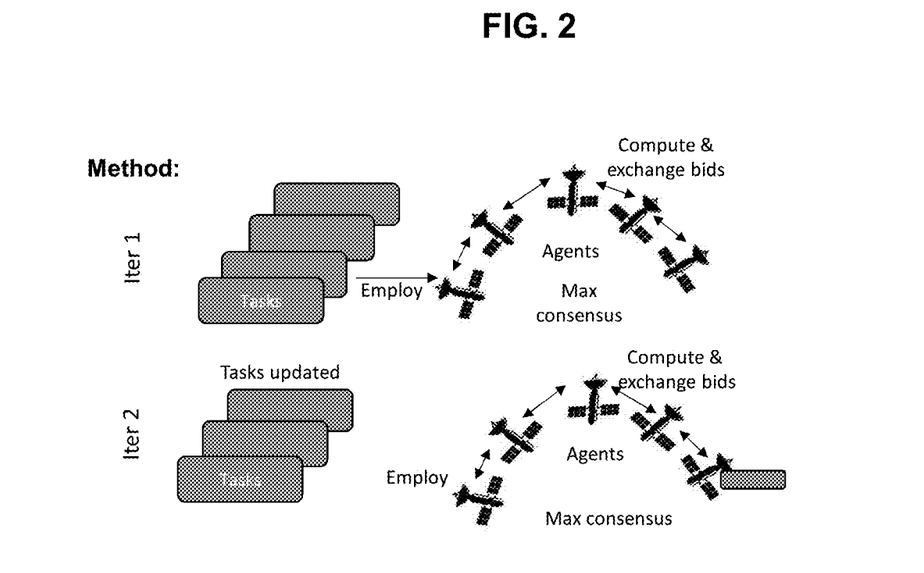
FIG. 2 shows components for an iterative method for cooperative multi-target tracking by a constellation of SVs, according to some embodiments of the disclosure.

FIG. 2 shows components for an iterative method for cooperative multi-target tracking by a constellation of SVs, according to some embodiments of the disclosure. As shown, in a first iteration with an initial state, tasks are employed to the constellation of SVs 102. Some examples of tasks include tracking of missiles or airborne platforms, surveillance of static or moving targets on the ground, navigation in the air or ground, and the like. The tasks are then employed to each SV and each SV computes its reward to the target in a bid. The bid information is disseminated through the entire graph of the SV network, for example using message-based communication. A "winner" SV with the best reward to the target is selected as the winner of the bids in this round of iteration and added to a winner list. In the next round, as time progresses and target characteristics changes, the tasks are updated and the updated tasks are deployed to the SVs for a second winner SV. This process is iterated until all tasks are assigned to SVs, or all SVs are assigned. In some embodiments, the required number of winner SVs inn the winner list data structure depends on the number of SVs needed to monitor all targets.

Figure 3:
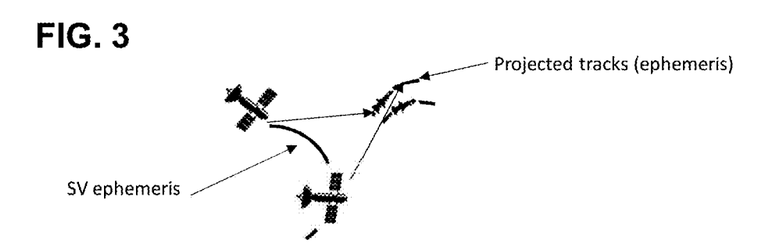
FIG. 3 illustrates an initialization phase, SV ephemeris and projected tracks for a multi-target tracking by a constellation of SVs, according to some embodiments of the disclosure.

FIG. 3 illustrates an initialization phase (without any target update events), SV ephemeris and projected tracks for a multi-target tracking by a constellation of SVs, according to some embodiments of the disclosure. In this context, Ephemeris refers to the trajectory information of celestial bodies, for example, airborne platforms, missiles and satellites. FIG. 3 also shows the calculated coverage of each SV for each target, where each SV bar shows the start, end and duration of each target (T1 and T2) coverage time period.

Figure 4A:
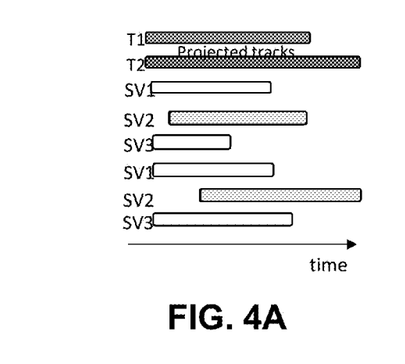
FIG. 4A depict an exemplary process for a first iteration of cooperative multi-target tracking, according to some embodiments of the disclosure.
Figure 4B:
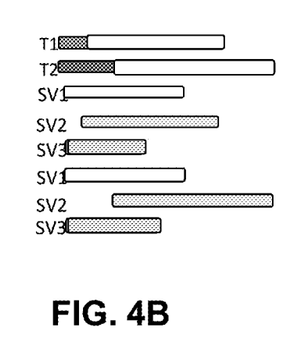
FIG. 4B shows an exemplary process for a second iteration of cooperative multi-target tracking, according to some embodiments of the disclosure.
Figure 4C:
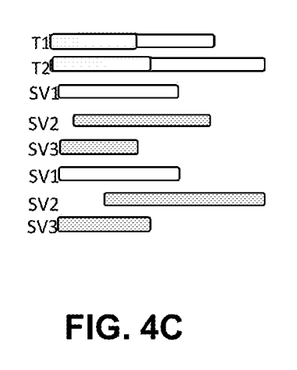
FIG. 4C illustrate an exemplary process for a third iteration of cooperative multi-target tracking, according to some embodiments of the disclosure.

Referring back to FIG. 2, each SV in geographic neighborhood of target(s) receives tracking information including projected tracks (e.g., location, speed, size, orientation, etc.) from one or more trackers, for example, multi-target tracking sensors, fusion or perception trackers. Each SV 102 then evaluates its bid (reward value), for example, visibility to the target(s), its availability, track coverage and/or accuracy, and exchange its bid with the neighboring SVs, for example, in a message. More details of the iterations are illustrated in FIGS. 4A, 4B and 4C. The reward values (bids) are evaluated (e.g., based on maximum consensus process) and an SV with the highest bid is added to the (optimal) team. The SV with the highest bid is then excluded from the next iteration and anther SV with highest bid is added to the team. This iterative process is continued until all tasks are covered or all SVs are exhausted.

FIG. 4A depict an exemplary process for the first iteration of cooperative multi-target tracking, according to some embodiments of the disclosure. In some embodiments, each SV 102 computes its bid, for example, SV1(bid=10), SV2 (bid=15) & SV3(bid=12); exchange the bids with the neighboring SVs. In some embodiments, a maximum consensus process is utilized among the biding SVs to find an SV with max (best) bid. The SV with best bid is then included in a team (set) and excluded from the next iteration.

T1 and T2 show the start time, end time and duration of targets 1 and 2. Each SV has two bars with different patterns showing its coverage of each target. For example, SV1 in T1 bar shows the coverage duration of SV1 on T1. The bid value in this example shows the total coverage duration of each SV. For example, SV1(10) means that SV1 can cover T1 and T2 for 10 time-units. In a fully-connected network, where each SV can communicate with all other SVs, the max bid can be agreed among all SVs in a single step. If a network is not fully-connected, then the number of steps that a max consensus on the max bid can be reached is based on the graph diameter, which is defined as the maximum number of hops that an SV message can be relayed to another SV.

FIG. 4B shows an exemplary process for the second iteration of cooperative multi-target tracking, according to some embodiments of the disclosure. As shown, each remaining SV updates the remaining task and computes its bid on the remaining tasks. As shown, in FIG. 4A, SV2 is selected as the winner bid SV, and it is used to cover part of T1 and T2 (shown in white in FIG. 4B). But as shown in FIG. 4B, there are still parts of T1 and T2 that are not covered by SV2. The portions are defined as remaining tasks and need to be covered by either SV1 or SV3 in this example. The remaining SVs then exchange their bids and a maximum consensus process is utilized among the remaining biding SVs to find another SV with max (best) bid. The SV with max bid is then added to the team (set). For instances, in FIG. 4B, during the second round of bid, SV3 is selected to cover the remaining parts of T1 and T3.

FIG. 4C illustrate an exemplary process for a third iteration of cooperative multi-target tracking, according to some embodiments of the disclosure. As shown, T1 and T2 are fully covered by SV2 and SV3, so the iterative process ends. In this example, each target is only required to be covered by one SV. In general, multiple SVs may be required to cover one target. The iterative process is continued until all tasks are covered or all SVs are exhausted.

In some embodiments, bids are calculated based on SV utilization. In some embodiments, utilization is the prior utilization and future tasks are assigned with associated utilization impact (within duty cycle window). In case of a tie in winning utilization-based bids by two or more SVs, tracking error (TE) measures such as target state error covariance or GDOP (geometric dilution of precision) computed for the SV with respect to the SVs in the current winner list, and the SV with the lowest tracking error wins. Tracking error is a term used in multi target tracking domain to quantify error in estimation of true target state, e.g. position, velocity, size, orientation etc., based on available measurements.

In some embodiments, bids are calculated based on weighted combination of utilization and 1/tracking error. For example, weights are assigned to each SV bid based on their visibility to the target(s), their availability, track coverage and/or tracking error. In some embodiments, each SV calculates its bid based on a weighted sum of utilization and tracking error such as $$bid = \text{w\_dur} * util(\text{team}) + \text{w\_tracErr}/TE(\text{team}) \quad (1)$$

where, util(team) and TE(team) are the utilization and tracking error values for the best team that has the current SV as a team member. Here, utilization means the SV coverage time duration, which will use up SV battery life. Accordingly, each SV has a limited utilization (battery charge).

In some embodiments, the weights are normalized as follow.

Maximum possible track duration for a team is calculated and denoted as maxDur

Minimum possible tracking error value for a team at any given time is calculated and denoted as min TrackErr Given user input weight for track duration w (0<=w<=1), normalized weight for utilization and GDOP are defined as:

$$\text{w\_dur} = w/\text{max}Dur \quad (2)$$

$$\text{w\_trackErr} = (1 - w) * \text{min}TrackErr \quad (3)$$

In a simulated example of 33 SVs, the number of SVs used decreases from 22 to 10, as utilization weight increases from 0 to 1, and the avg total GDOP (TE measure used for illustration) values increases from 6.15 to 13.32, as GDOP weight decreases from 1 to 0

Figure 5:
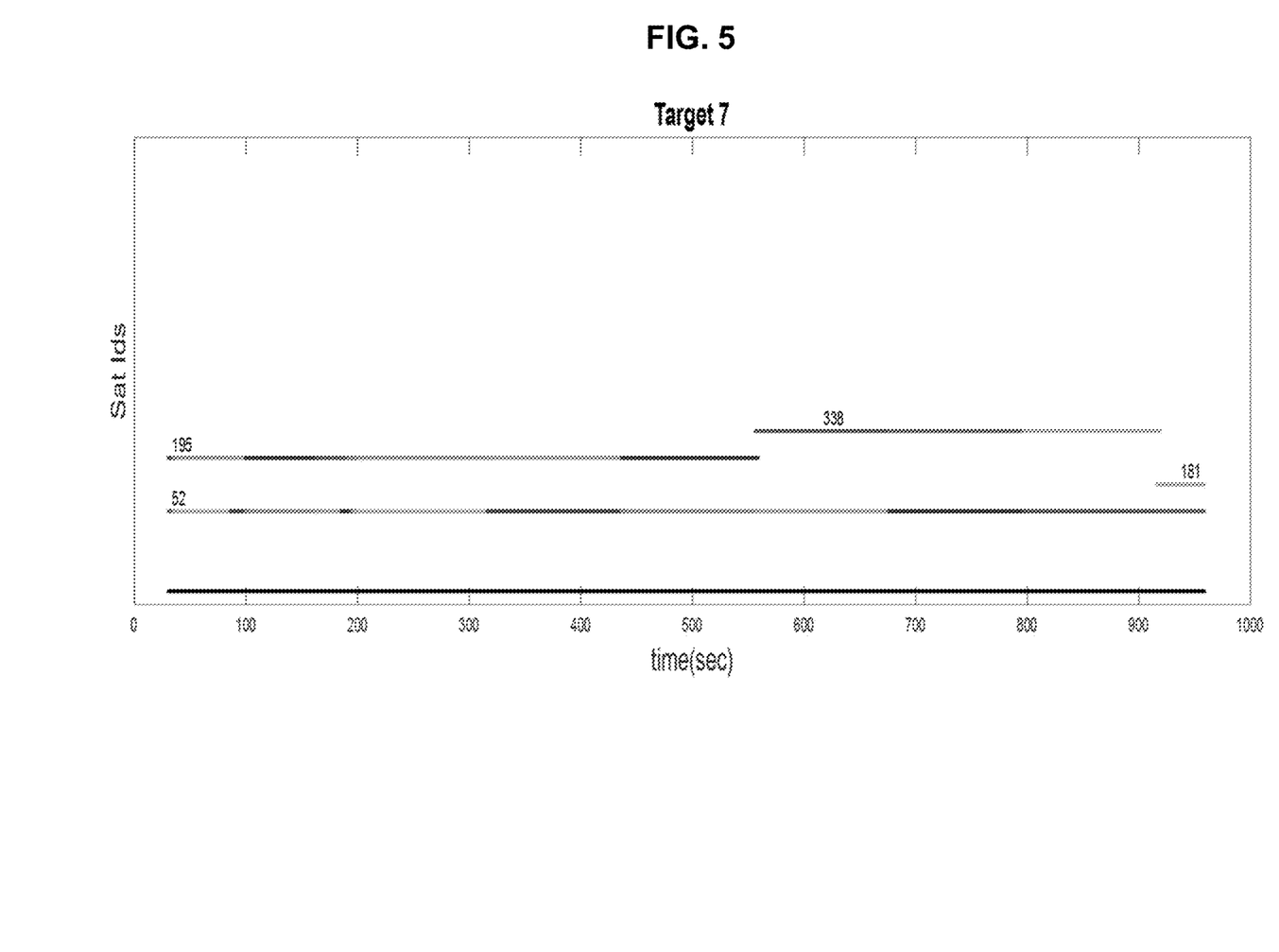
FIG. 5 illustrates an example of a target that needs to be tracked by a minimum of two SVs, according to some embodiments of the disclosure.

FIG. 5 illustrates an example of a target ("Target7") that needs to be tracked by a minimum of two SVs over time (in this case, seconds on the horizontal axis), according to some embodiments of the disclosure. As shown by horizontal line 52, SV 52 can cover the entire duration of the target (e.g., from time 0 to 980). SVs 195, 338 & 181 (depicted by horizontal lines 195, 338 and 181, respectively) form a chain of custody to cover the entire duration of the target to ensure that the target is monitored by at least 2 SVs at all time, i.e., SV 52 and at least one other SV.

When switching SVs, there is a handoff requirement for some overlapped monitoring time period (in this example, 5 time-units, or seconds) that both SVs in the chain of custody need to monitor the target, before the hand off. SV 195 monitors the target during time period from time 29 to 559; while SV 338 monitors from time 555 to 920. Accordingly, there are 5 time-units from 555 to 559 that both SV 195 and SV 338 monitor the target, defined to be handoff overlap.

Figure 6:
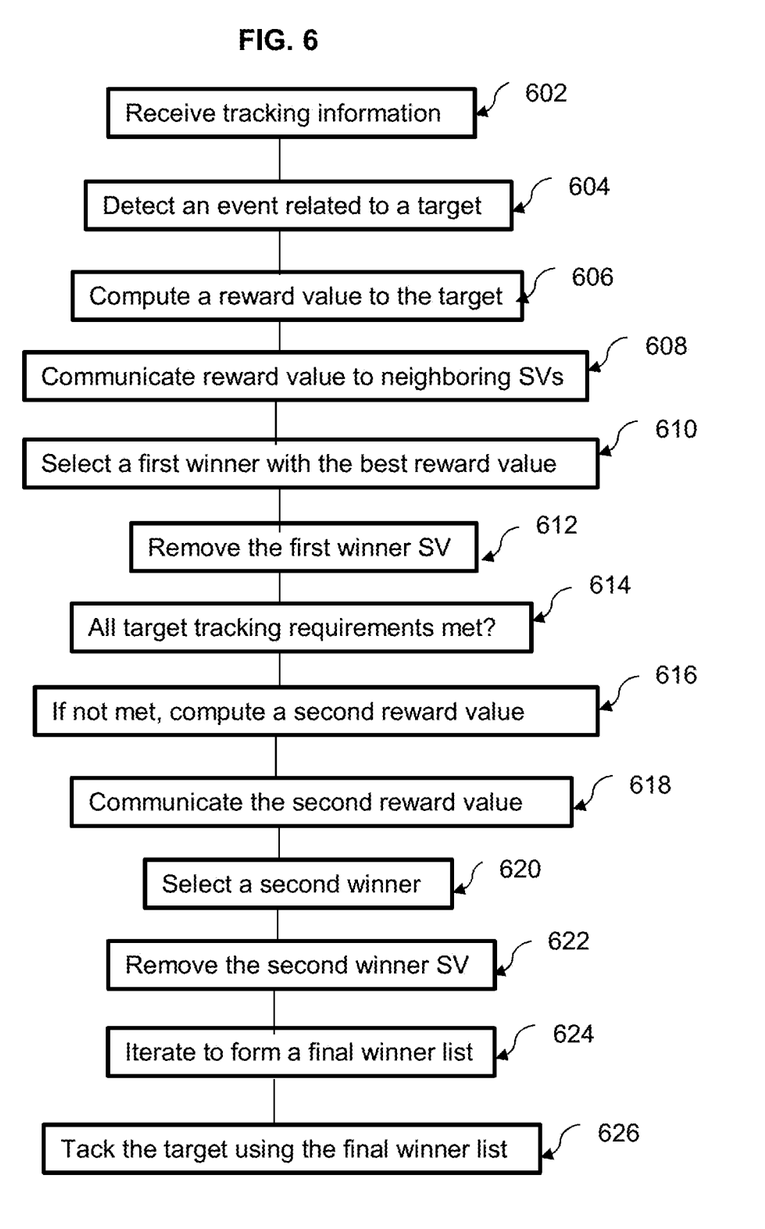
FIG. 6 depicts an exemplary process flow for distributed satellite management for cooperative multi-target tracking, according to some embodiments of the disclosure.

FIG. 6 depicts an exemplary process flow for distributed satellite management for cooperative tracking of multi-targets. As shown in block 602, tracking information is received from one or more trackers by a group of satellite vehicles (SVs) in the constellation. Tracking information may include projected tracks, for example, location, speed, size, orientation, etc. In block 604, an event related to one or more targets is detected by some of SVs in the constellation, e.g., using on-board and off-board various sensors to the tracking information. A winner SV with highest reward (e.g., the one with best visibility to a target, its availability, track coverage and/or accuracy) is selected and added to a winner list data structure, in block 606. The winner SV is then removed from the plurality of SVs to form a revised group of SVs, in block 608. The revised group of SVs then determines whether all target tracking requirements (e.g., the number of SVs needed to track a target for the duration of the target tracking) are met by the plurality of SVs, in block 610.

In block 612, if all target requirements are not met, a second reward value for the target is calculated by each of the revised group of SVs and the second reward values are sent (in a message) as an auction bid to the neighboring SVs, each of the revised group of SVs. A second winner SV that has the maximum second reward value is then selected and the second winner SV is stored in the winner list data structure in block 614.

The second winner SV is then removed from the revised group of SVs to form another revised of SVs, in block 616. In block 618, this process is repeated from the step of checking to see whether each remaining SV meets the target requirements until the target tracking requirements are satisfied and when the iterations are completed, a final winner list data structure is generated and stored, in block 620. The targets are then tracked using the final winner list, in block 622.

In some embodiments, one or more tangible computer storage medium may store therein computer instructions, which when executed by one or more processing circuit perform the above process.

Tracking may be prioritized relative to other potential future tasks. For example, track segments for auctioning may be exposed based on their priority. In some embodiments, tasks have different priorities. For example, monitoring a static ground target in certain regions of the world may have higher priority than targets in other regions. In a case when an SV is already assigned to a task for some future time slot, e.g., time 100-200, if the current task has higher priority compared to the assigned future task, it can override the future assignment; otherwise, the current assignment cannot use time slot 100-200 since that time slot is already being used.

In some embodiments, the process provides coverage using requisite minimum number of SVs which could be different for different tracks and generates multiple tasks per track, e.g., it is possible that a first target (task) needs to be tracked by two SVs, while another target needs to be tracked by a different number of SVs, e.g., 3 SVs. In some embodiments, for a two tracking SV requirement, the track is replicated twice and for a three SV requirement, the track is replicated three times and so on. In a case where a target needs to be tracked by 2 SVs, it can be treated as two targets with the same trajectory. For example, in FIG. 4A, if T1 needs to be tracked by two SVs, there will be two duplicated bars representing T1 tracking task.

In some embodiments, the process starts with the highest priority task and goes down in priority once either higher priority task is assigned/covered or found to be infeasible. For instances, in case there may not be sufficient SVs to cover all tasks, to ensure higher-priority tasks are covered before lower-priority ones, the process tries to bid on higher-priority tasks first. Once all higher-priority tasks are covered (or it is found to be impossible to cover them), then the process moves on to bid on lower-priority tasks.

The coverage duration is not only based on the required task duration, but also based on the remaining duration (or battery life) of the SV. For example, if the current task requires to be tracked for 50 time-units (i.e., utilization of task=50), the maximum battery life of SV is 100, and some future scheduled high-priority task will use 60 time-units, then the available utilization is only 40. Accordingly, the SV can only cover the current task with min (50, 100−60)=40 time-units.

In some embodiments, the bid is then set to be

Min(utilization needed for task, (4)

Maximum_utilization − future_task_utilization − current_utilization)

In some embodiments, for tradeoff of utilization and tracking accuracy, if two Svs have same utilization bid, the one which leads to higher tracking accuracy (e.g., that results in lower tracking error) is selected. In some embodiments, the bid is computed based on weighed combination of overall utilization and tracking accuracy. When different weights are used, a Pareto front is formed and can be used to assess the tradeoff. The user is then given the option to select a solution on the Pareto front.

In some embodiments, the convergence of the auction iterative process depends on rapid information sharing amongst the nodes of a network graph (SVs). The performance varies depending on the size of the network graph and interconnection structure. In some embodiments, to accelerate the convergence, the team includes only the satellites that can view the target(s) or need to be included to relay information. As some SVs may not be able to view the targets, in order to reduce communication overhead, the SVs in the constellation that cannot view targets may be excluded from the bidding process, unless they play a role in relaying messages.

Given the auction process requires the equivalent of maximum consensus, the number of hops for a complete network graph is 1 step and for a regular grid or mesh network (that may be a simplification in in wave constellation settings) is:

$$G(D) = N_y + \left\lfloor \frac{N_x}{2} \right\rfloor \quad (5)$$

where Ny is the number of SVs in the y direction and Nx is the number of Svs in the x direction.

In some embodiments, the tracking error is computed using known dilution of precision method, however, any other metric can be used in our proposed framework.

The present disclosure provides the ability to deal with different multi-target tracking constraints in sequential auction framework by modifying task definition used in the bidding process by incorporating multi-target tracking requirements in an auction framework. The message sizes have small footprint, i.e., minimal information is required to solve the constrained optimization. The disclosure has many other applications such as UxV, (UAV: unmanned aerial vehicle, UUV: unmanned underwater vehicle, or UGV: unmanned ground vehicle) management, collaborative robotics, air traffic management, and the like.

Furthermore, the system and method of the present disclosure is capable of moving planning from ground stations to onboard satellite vehicles and makes tasking scalable and efficient resulting in faster response times for uncertain and dynamic mission needs. The system and method seamlessly handle insertion and removal of tasks/satellites and changing mission goals/contingencies and reduces communication bandwidth requirements with no single point of centralized failure.

In some embodiments, the present framework is extensible to varying mission needs, including dynamic target tracking, persistent static target coverage, coincident collection; varying satellite network topologies, including mesh-based, vehicle plane providing interconnects, and ground relays; and varying satellite orbital regimes/planes including a mix of pLEO, GEO, MEO/HEO satellite vehicles with heterogenous sensing capabilities/constraints.

It will be recognized by those skilled in the art that various modifications may be made to the illustrated and other embodiments of the disclosure described above, without departing from the broad scope thereof. It will be understood therefore that the disclosure is not limited to the particular embodiments or arrangements disclosed, but is rather intended to cover any changes, adaptations or modifications which are within the scope and spirit of the disclosure as defined by the appended claims and drawings.

The invention claimed is:

1. A method for an auction-based satellite cooperative multi-target tracking, executed by one or more satellite vehicles (SVs) in a constellation of SVs, the method comprising:
    a) receiving tracking information from a tracker by a plurality of SVs in the constellation;
    b) detecting an event related to a target by the plurality of SVs responsive to the tracking information;

c) computing a reward value to the target, by each of the plurality of SVs;
d) communicating the reward value in a bid message to neighboring SVs, by each of the plurality of SVs;
e) selecting a first winner SV with a best reward value and placing the first winner SV in a winner list;
f) removing the first winner SV from the plurality of SVs to form a second the plurality of SVs;
g) determining whether all target tracking requirements, including tracking of a plurality of targets, are met by the plurality of SVs;
h) when all target requirements are not met, computing a second reward value for the target, by each of the second plurality of SVs;
i) communicating the second reward value in a second bid message to neighboring SVs, by each of the second plurality of SVs;
j) selecting a second winner SV with maximum second reward value and storing the second winner SV in the winner list;
k) removing the second winner SV from the second plurality of SVs to form a third plurality of SVs;
i) repeating processes g to k until the target tracking requirements are satisfied, to form a final winner list; and
m) applying the final winner list to a sequence of handoffs between SVs of the constellation of SVs to produce synchronized tracking of the plurality of targets.

2. The method of claim 1, wherein the reward value includes one or more of best visibility to the target, availability of a respective SV, best track coverage or utilization of the respective SV, and best accuracy of the respective SV.

3. The method of claim 1, further comprising evaluating the bids based on a maximum consensus process for selecting a winner SV.

4. The method of claim 1, wherein the tracker is a multi-target tracking module incorporating sensor fusion.

5. The method of claim 1, further comprising computing utilization of the winner SVs.

6. The method of claim 5, wherein in case of a tie in two winner SVs based on SV utilization, tracking error for each of the two winner SVs with respect to a current winner list is computed and an SV with a lowest tracking error is selected as a winner of the two SVs.

7. The method of claim 1, wherein bid messages are based on weighted combination of utilization of a respective SV and 1/tracking error for the respective SV in best team that has a current SV as a team member.

8. The method of claim 1, wherein the tracking information includes one or more of projected tracks of a target, location of the target, speed of the target, size of the target, and orientation of the target.

9. The method of claim 1, further comprising ordering the received tracking information based on respective priorities.

10. The method of claim 1, further comprising including a hand off time period between handing off tracking of the target by two or more SVs.

11. The method of claim 1, further comprising, when two SVs have same utilization, selecting an SV with higher tracking accuracy.

12. A tangible computer storage medium having stored therein computer instructions, the computer instructions when executed by one or more computers perform a method for an auction-based satellite cooperative multi-target tracking, executed by one or more satellite vehicles (SVs) in a constellation of SVs, the method comprising:

a) receiving tracking information from a tracker by a plurality of SVs in the constellation;
b) detecting an event related to a target by the plurality of SVs responsive to the tracking information;
c) computing a reward value to the target, by each of the plurality of SVs;
d) communicating the reward value in a bid message to neighboring SVs, by each of the plurality of SVs;
e) selecting a first winner SV with a best reward value and placing the first winner SV in a winner list;
f) removing the first winner SV from the plurality of SVs to form a second the plurality of SVs;
g) determining whether all target tracking requirements, including tracking of a plurality of targets, are met by the plurality of SVs;
h) when all target requirements are not met, computing a second reward value for the target, by each of the second plurality of SVs;
i) communicating the second reward value in a second bid message to neighboring SVs, by each of the second plurality of SVs;
j) selecting a second winner SV with maximum second reward value and storing the second winner SV in the winner list;
k) removing the second winner SV from the second plurality of SVs to form a third plurality of SVs;
l) repeating processes g to k until the target tracking requirements are satisfied, to form a final winner list; and
m) applying the final winner list to a sequence of handoffs between SVs of the constellation of SVs to produce synchronized tracking of the plurality of targets.

13. The tangible computer storage medium of claim 12, wherein the reward value includes one or more of best visibility to the target, availability of a respective SV, best track coverage or utilization of the respective SV, and best accuracy of the respective SV.

14. The tangible computer storage medium of claim 12, wherein the method further comprises evaluating the bids based on a maximum consensus process for selecting a winner SV.

15. The tangible computer storage medium of claim 12, wherein the tracker is a multi-target tracking module incorporating sensor fusion.

16. The tangible computer storage medium of claim 12, wherein the method further comprises computing utilization of the winner SVs.

17. The tangible computer storage medium of claim 16, wherein in case of a tie in two winner SVs based on SV utilization, tracking error for each of the two winner SVs with respect to a current winner list is computed and an SV with a lowest tracking error is selected as a winner of the two SVs.

18. The tangible computer storage medium of claim 12, wherein bid messages are based on weighted combination of utilization of a respective SV and 1/tracking error for the respective SV in best team that has a current SV as a team member.

19. The tangible computer storage medium of claim 12, wherein the tracking information includes one or more of projected tracks of a target, location of the target, speed of the target, size of the target, and orientation of the target.

20. The tangible computer storage medium of claim 12, wherein the method further comprises ordering the received tracking information based on respective priorities.

* * * * *